United States Patent
Satheesh et al.

(10) Patent No.: US 9,832,524 B2
(45) Date of Patent: Nov. 28, 2017

(54) CONFIGURING TELEVISION SPEAKERS

(71) Applicant: Caavo Inc, Santa Clara, CA (US)

(72) Inventors: Sharath Harihapur Satheesh, Bangalore (IN); Shankara Raman Sundararajan, Bangalore (IN); Ashish Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 8 days.

(21) Appl. No.: 14/945,104

(22) Filed: Nov. 18, 2015

(65) Prior Publication Data

US 2016/0142849 A1     May 19, 2016

Related U.S. Application Data

(60) Provisional application No. 62/081,427, filed on Nov. 18, 2014.

(51) Int. Cl.
   *H04R 5/00*          (2006.01)
   *H04N 21/439*      (2011.01)
   *H04N 21/4363*     (2011.01)
   *H04S 3/00*          (2006.01)
   *H04S 7/00*          (2006.01)

(52) U.S. Cl.
CPC ....... *H04N 21/4396* (2013.01); *H04N 21/439* (2013.01); *H04N 21/43635* (2013.01); *H04S 3/008* (2013.01); *H04S 7/308* (2013.01)

(58) Field of Classification Search
CPC ...... H04S 3/008; H04S 7/308; H04S 2400/05; H04N 21/4396; H04N 21/43635; H04N 21/439; H04N 21/4394; H04N 7/165; H04R 5/00; H04R 5/04; H04R 2205/021
USPC .......................................................... 381/17
See application file for complete search history.

(56) References Cited

U.S. PATENT DOCUMENTS

| | | | |
|---|---|---|---|
| 7,212,253 B1 * | 5/2007 | de Groot | H04N 5/607 348/553 |
| 2010/0058384 A1 * | 3/2010 | Mortensen | H04N 21/4852 725/38 |

\* cited by examiner

*Primary Examiner* — Paul S Kim
*Assistant Examiner* — Sabrina Diaz
(74) *Attorney, Agent, or Firm* — Fiala & Weaver P.L.L.C.

(57) ABSTRACT

Methods, systems, and apparatuses are described for configuring television speakers. A television may be configured to operate as a center channel speaker for an audio system. Television speakers may be calibrated according to other speakers utilized by the audio system. The handling of HDMI commands by the television may modified such that the television speakers and the audio system speakers concurrently produce sound.

19 Claims, 6 Drawing Sheets

CONFIGURING TELEVISION SPEAKERS

CROSS-REFERENCE TO RELATED APPLICATIONS

The present application claims priority to U.S. Application Ser. No. 62/081,427, entitled "CONFIGURING TELEVISION SPEAKERS," filed on Nov. 18, 2014, the entirety of which is incorporated by reference herein.

The present application is related to U.S. patent application Ser. No. 12/988,486, issued as U.S. Pat. No. 8,588,431, entitled "Electrical System for a Speaker and its Control," filed on Apr. 20, 2009, the entirety of which is incorporated by reference herein.

BACKGROUND

Technical Field

The present invention relates to methods, systems, and apparatuses for configuring television speakers.

Background

A basic living room audio/video entertainment system is a television (TV) with audio/video sources. For a home theater-like audio experience, an audio/video receiver (AVR) and external speakers may be added.

Having only the TV as the audio device introduces constraints such as no surround sound, lower loudness levels, etc. In cases of a TV having multiple speakers for more room-filling audio, the acoustics of the room can still play a major role in degrading the quality of sound.

Surround sound systems with external speakers compensate for issues with TV-only audio to some extent by providing audio channel separation. However, the effect of room acoustics can still require compensation for overall audio quality. In addition, the TV speaker may be unused due to the center channel speaker of the audio system replacing it.

BRIEF SUMMARY

Methods, systems, and apparatuses are described for configuring television speakers, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "about," "substantially," and "approximately" are intended to have similar or the same meaning, and these terms may be used interchangeably. The use of these terms is intended to convey meaning in accordance with MPEP §2173.05(b).

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The embodiments described herein alleviate and/or eliminate the above-noted problems by enhancing the quality of audio from television (TV) speakers and also facilitating TV speaker usage as a center channel speaker in a home theater system. While various embodiments herein may be described with respect to a TV as the center channel for audio, embodiments are not so limited. The example techniques and embodiments described herein may be adapted to various types of systems and devices, such as electronic devices or other audio/video devices like TVs. By way of example but without limitation, the embodiments herein may be adapted to communication devices (e.g., cellular and smart phones, etc.), computers/computing devices (laptops, tablets, desktops, etc.), computing systems, other electronic devices such as gaming consoles, other home electronics and entertainment devices, and/or the like, that may output audio signals via a speaker(s) to produce sound. As described herein, an electronic device may mean an audio/video device or a consumer electronic device, and is distinguished from an audio speaker (e.g., a loudspeaker). It is contemplated herein that in various embodiments and with respect to the illustrated figures of this disclosure, one or more components described and/or shown may not be included and that additional components may be included.

Figure 1:
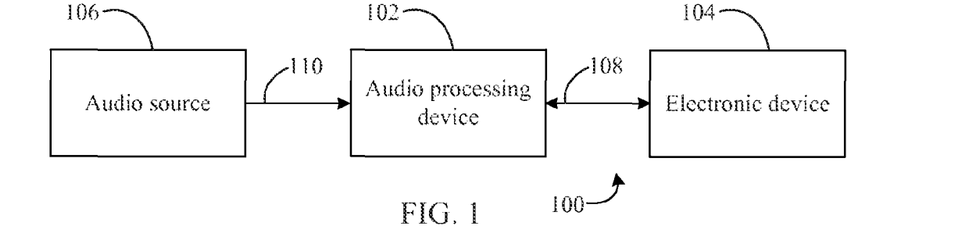
FIG. 1 is a block diagram of a system with an electronic device configured to act as a center channel speaker, according to an exemplary embodiment.

As noted above, according to embodiments, a user/consumer of audio/video content may desire to use an electronic device such as an audio/video device (e.g., a TV) that has at least one speaker as the center channel for listening to audio output. For example, FIG. 1 is a block diagram of a system 100 with an electronic device configured to act as a center channel speaker, according to an exemplary embodiment. System 100 may be referred to as an audio system in embodiments. As shown, system 100 includes an audio processing device 102, an electronic device 104, and an audio source 106. Audio processing device 102 may receive audio input from audio source 106 on an input connector 110. Electronic device 104 may be communicatively coupled to audio processing device 102 via connector 108 over which audio and/or video data may be communicated. In embodiments, input connector 110 and connector 108 may be wired and/or wireless connections, and in according to embodiments, connector 108 may be a high-definition media interface (HDMI) connection.

Audio source 106 may be any multimedia content source that provides audio and/or video for consumption by a user(s). For example, and without limitation, audio source 106 may be a radio or stereo, a set top box (STB), a DVD player, a CD/MP3 player, a computer, a multimedia streaming device (e.g., Roku®, etc.), a service (e.g., NetFlix®, Hulu®, etc.) operating on an electronic device, and/or the like. Audio source 106 may provide an audio signal on input connector 110 to audio processing device 102, and in embodiments, multiple audio channels such as left, right, center, etc., may be provided via input connector 110.

Audio processing device 102 may be configured to process audio input signals from audio source 106. In embodiments, audio processing device 102 or a device in which audio processing device 102 is included, may have one or more speakers or one or more speaker output connections for generating audio output sound from processed audio inputs. Audio processing device 106 is also configured to provide a center channel audio signal portion to electronic device 104.

Electronic device 104 may be any audio/video device or multimedia device that provides audio output sound and/or video output images for consumption by one or more users with the exception of stand-alone audio speakers. That is, according to the embodiments herein, an electronic device like electronic device 104 is not merely a stand-alone speaker through which center channel audio may be generated, but rather is a separate audio/video device, such as a TV or another of examples provided herein, which is capable of producing sound by processing an audio and/or video data signal to produce an audio electrical signal that may drive and be broadcast as sound by an audio speaker of the electronic device. For example, electronic device 104 may include one or more speakers and be configured to simultaneously play center channel audio sound as speakers of audio processing device 102 produce sound based on other portions of the audio signal from audio source 106. However, electronic device 104 is not a stand-alone loudspeaker.

According to embodiments, audio processing device 102 may be, or may be included in, an audio/video receiver (AVR) device. In some embodiments, audio source 106 and audio processing device 102 may be included in a single device. Further details and embodiments for system 100 are described below.

The embodiments described herein provide for the ability of a user to configure the audio/video device (e.g., TV) speaker(s) as the center channel and use the audio system and audio/video device speakers concurrently. Embodiments also provide for calibration of audio/video device speaker(s) according to audio system speaker specifications for improved audio quality. For instance, in some cases where the TV speaker(s) is/are used with the audio system as the center channel, the specifications of the TV speaker(s) may not match the speakers of the audio system thereby giving non-coherent audio. The described embodiments also provide for the ability to calibrate the TV speaker(s) with one or more surround sound speakers of a home theater system.

Accordingly, the techniques and embodiments described herein provide for improvements in configuring speakers, as described above, including but not limited to TV speakers.

For instance, methods, systems, devices, and apparatuses are provided for improved speaker configurations. A method in an audio/video device in accordance with an example aspect is described. The method includes receiving at least a first portion of an audio signal generated by an audio source from an audio processing device, the audio processing device producing second sound via one or more audio processing device speakers based on at least a second portion of the audio signal. The method also includes producing first sound by the audio/video device based on the at least a first portion of the audio signal, the first portion corresponding to a center channel audio component of the audio signal.

A method in accordance with another example aspect is described. The method is performed in an audio system and includes receiving an audio signal from an audio source, the audio signal comprising at least a first portion and a second portion, and processing at least the first portion of the audio signal. The method also includes producing first sound via one or more speakers of the audio processing device based on at least the first portion subsequent to the processing, and providing at least the second portion of the audio signal to an audio/video device comprising at least one speaker to produce second sound.

An audio processing device in accordance with another example aspect is described. The audio processing device includes an input component, a processing component, and an output component. The input component is configured to receive an audio signal from an audio source. The processing component is configured to process at least a first portion of the audio signal. The output component is configured to provide the first portion of the audio signal to one or more speakers of the audio processing device to produce first sound subsequent to being processed, and provide a second portion of the audio signal to an audio/video device having at least one speaker to produce second sound.

Various example embodiments are described in the following subsections. In particular, example TV speaker as center channel embodiments are described. Next, non-HDMI audio embodiments are presented, followed by TV speakers without an external audio system embodiments. This is followed by calibrating TV speakers embodiments, then further example embodiments and advantages are described and subsequently an example computer implementation is described. Finally, some concluding remarks are provided. It is noted that the division of the following description generally into subsections is provided for ease of illustration, and it is to be understood that any type of embodiment may be described in any subsection.

III. Example TV Speaker as Center Channel Embodiments

Systems and devices may be configured in various ways according to the embodiments and techniques described herein. In embodiments, a TV may be provided with a center channel audio signal from an external audio system using, e.g., an audio/video receiver (AVR), in different ways such as, but without limitation: analog mono audio, digital mono audio, HDMI (high-definition media interface) audio, etc. The TV is configured to provide audio output (i.e., sound) according to a center channel portion of an audio signal concurrently with audio output (i.e., sound) being provided by an audio processing device according to another portion of the audio signal.

Figure 2:
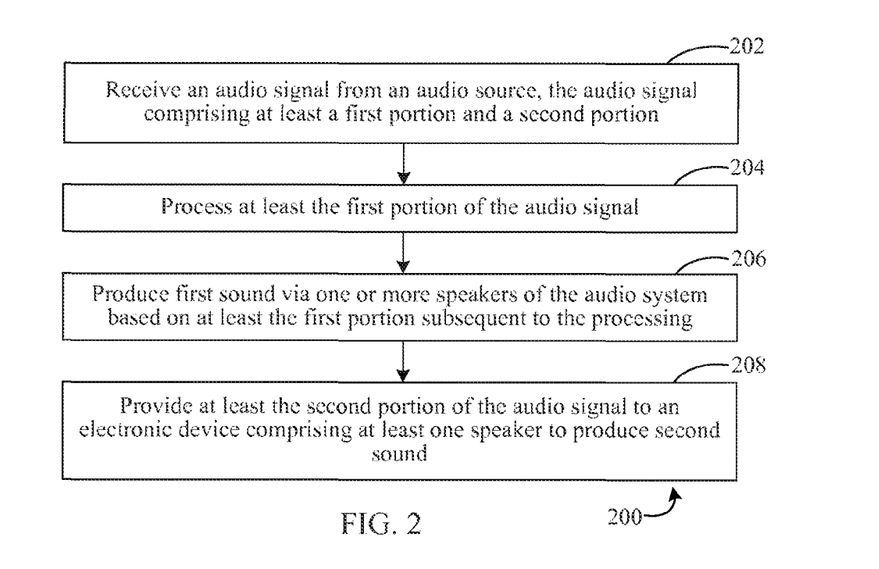
FIG. 2 is a flowchart of a method for configuring television speakers, according to an exemplary embodiment.

In FIG. 2 a flowchart 200 is shown. Example embodiments described herein may be configured to perform speaker configuration according to flowchart 200. For instance, system 100 of FIG. 1, including subcomponents audio processing device 102 and electronic device 104, as well as other systems and devices described below, may perform speaker configuration according to flowchart 200. Flowchart 200 is described as follows.

Figure 3:
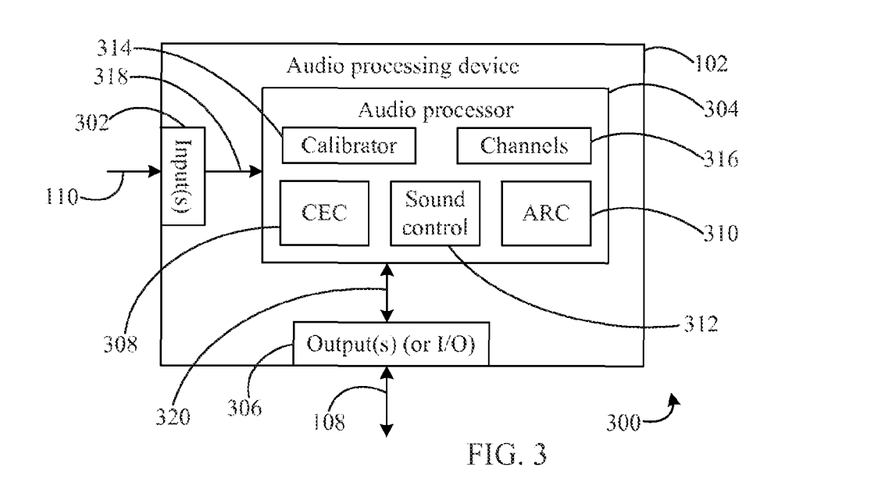
FIG. 3 is a block diagram of an audio processing device, according to an exemplary embodiment.

An audio signal is received from an audio source, the audio signal comprising at least a first portion and a second portion (202). For instance, referring back to FIG. 1, an audio signal is received over input connector 110 by audio processing device 102 from audio source 106. Turning now to FIG. 3, an exemplary device configuration 300 is shown. Device configuration 300 shows an embodiment of audio processing device 102 of FIG. 1. As shown, audio processing device 102 has input(s) 302 to receive audio signals over input connector 110, e.g., from an audio source such as audio source 106 of FIG. 1. The received audio signal may include a plurality of channels, such as, but not limited to: center, left, right, sub-woofer, surround left, surround right, etc., which may be grouped in any way into portions of the audio signal.

At least the first portion of the audio signal is processed (204). For example, referring again to FIG. 3, the first portion of the audio signal received on input connector 110 may be provided via connector 318 to an audio processor 304 for processing.

Audio processor 304 may include components to perform different types of processing for audio signals and audio related tasks. For example, as shown in FIG. 3, audio processor 304 includes a consumer electronics control (CEC) component 308, an audio return channel (ARC) component 310, a calibrator 314, and a channels component 316. Calibrator 314 is configured to calibrate external speakers that receive output audio signals according to speakers associated with audio processing device 102. Channels component 316 is configured to identify audio channels in an audio signal and provide certain sets of channels (i.e., audio signal portions) to different speakers of audio processing device 102 and/or electronic devices. Consumer electronics control (CEC) component 308 and ARC component 310 are configured to implement aspects of the HDMI protocol standard for CEC and ARC messages/signals. Sound control component 312 is configured to control sound (e.g., volume, balance, fade, treble, base, etc.) generated by audio outputs provided via a connector 320 and output(s) 306 to connector 108.

Additionally, audio processor 304 is configured to perform standard, known audio signal processing, as would understood by a person of skill in the relevant art(s) having the benefit of this disclosure, such as filtering and/or the like.

Referring back to flowchart 200, first sound is produced via one or more speakers of the audio system based on at least the first portion subsequent to the processing (206). For instance, turning now to FIG. 4, an example center channel audio configuration 400 using a TV speaker(s) as the center channel speaker is shown where first sound is produced via one or more speakers of the audio system. Center channel audio configuration 400 includes a simplified representation of audio processing device 102 of FIG. 3 for illustrative clarity, although it is contemplated that audio processor 304 in center channel audio configuration 400 may include some or all of its subcomponents described with respect to FIG. 3.

Figure 4:
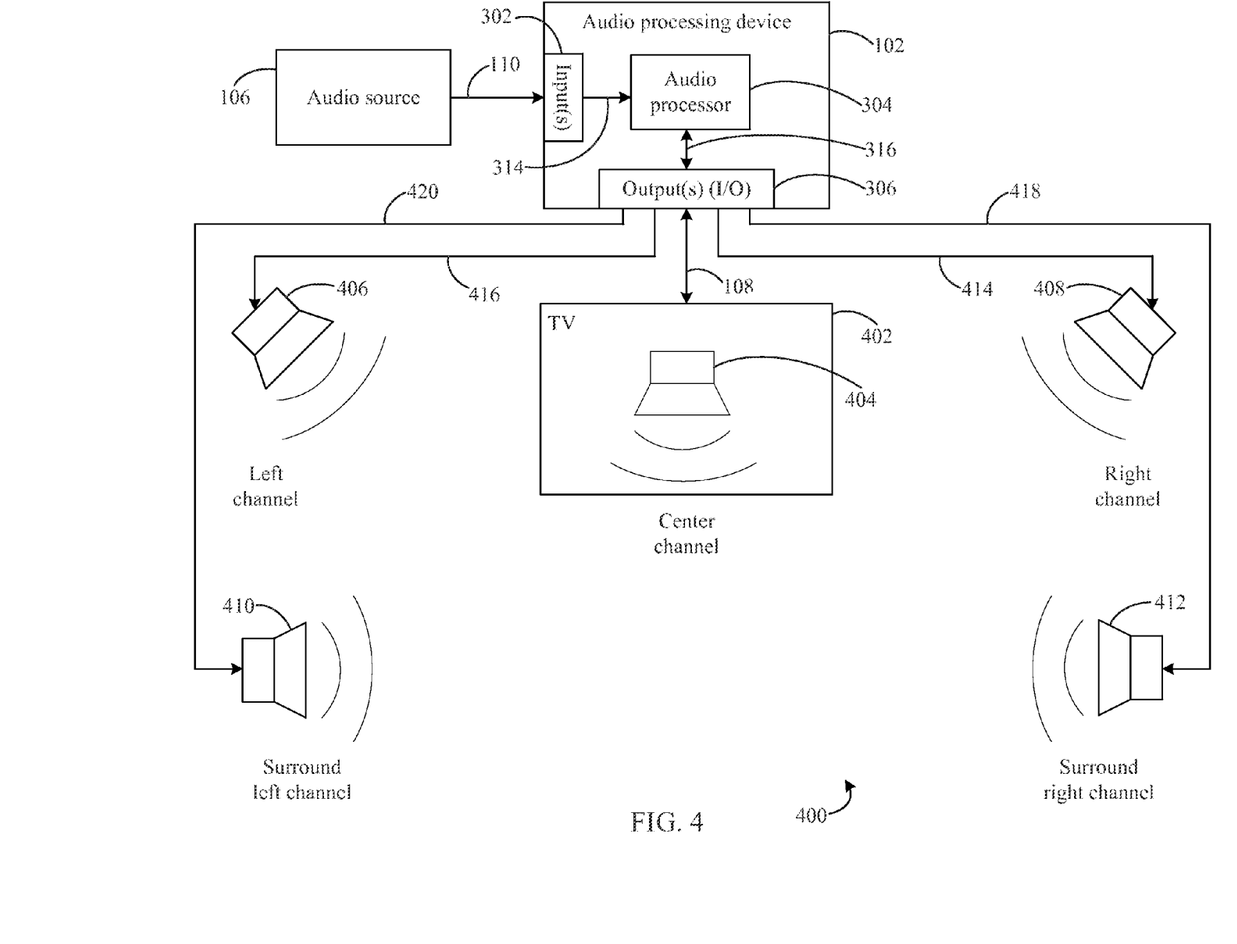
FIG. 4 is a block diagram of an implementation of a television configured to act as a center channel speaker for an audio system, according to an exemplary embodiment.

As shown, center channel audio configuration 400 includes four audio system speakers: a speaker 406 (left channel connected via a connector 416), a speaker 408 (right channel connected via a connector 414), a speaker 410 (surround left channel connected via a connector 420), and a speaker 412 (surround right channel connected via a connector 418). Each of these audio system speakers is connected, as shown, to an output of audio processing device 102 via output(s) 306. The processed first portion is provided to the audio system speakers on the appropriate channels to produce first sound.

Referring back to flowchart 200 (FIG. 2), at least the second portion of the audio signal is provided to an electronic device comprising at least one speaker to produce second sound (208). For example, with reference to FIG. 3, output(s) 306 (which may be input/output (I/O) in embodiments) provide audio signals or portions thereof to electronic devices such as electronic device 104 of FIG. 1 via connector 108. As shown in example center channel audio configuration 400 (FIG. 4), electronic device 104 is a TV 402 having at least one speaker 404 (and a display, not indicated in FIG. 4). TV 402 is connected to output(s) 306 via connector 108. In the illustrated embodiment, connector 108 is an HDMI I/O connector, although alternative connection types are contemplated herein. As illustrated, TV speaker 404 is configured to receive a center audio channel signal from audio processing device 102 and produce second sound therefrom.

The embodiments herein provide for utilization of center channel audio configuration 400 as shown in FIG. 4 for non-HDMI audio as well as for HDMI audio.

For HDMI audio embodiments, HDMI is used for the audio connection (e.g., connector 108), and a single cable such as an HDMI cable, carries both the audio and the video signals. Audio may be received and processed by audio processing device 102 (which may be included in an AVR), and video is provided to TV 402. According to embodiments herein, audio may still be received and processed by audio processing device 102, but processed or unprocessed audio to be played out on TV speakers 404 may be provided to TV 402, along with the video, over the same HDMI cable (e.g., via connector 108).

HDMI devices communicating via the HDMI standard should adhere to the protocols as defined by the HDMI consortium. In embodiments described herein, protocols that may be affected are the consumer electronics control (CEC) and audio return channel (ARC) protocols. However, it should be noted that these protocols are optional and their support is not mandatory. That is, if the requirements of the CEC and the ARC protocols need not strictly be met, various aspects of the embodiments described herein may provide for modifications to an AVR through audio processing device 102, and adherence to the required HDMI specification can be met. In some embodiments, to conform to the HDMI specification for the CEC and the ARC protocols, various described techniques may provide for changes in the TV (e.g., TV 402), as described below in further detail with respect to FIG. 7.

A. Handling HDMI Audio by Audio Systems

1. Consumer Electronics Control (CEC)

According to example embodiments for handling HDMI audio, the handling of the CEC protocol may be accomplished as follows. Audio processing device 102 may be designated as the "audio system" in the HDMI chain with a logical address 5. Audio processing device 102 may be included in an AVR, or may be an AVR in such embodiments. CEC messages or commands exchanged between TV 402 and audio processing device 102 (the "audio system") according to the HDMI protocol may be, without limitation, device power status (get/report), system audio mode (set/status/report/get), audio descriptors, user control (e.g., remote control presses for volume and/or mute). Regular operation of audio processing device 102 as the "audio system" may include, without limitation, the following scenarios:

If audio processing device 102 is on, TV 402 will mute its speaker(s) 404, and all audio commands (e.g., volume/mute) transmitted to TV 402 are passed on to audio processing device 102;

If audio processing device 102 is off, TV 402 will turn on its speaker(s) 404, and no audio commands (e.g., volume/mute) are passed on to audio processing device 102; and Only one set of speakers (either TV speakers 404 or audio processing device 102 speakers 406, 408, 410, and 412) will be on at a given time, and all audio commands (e.g., volume/mute) are processed by the device or system with active speakers.

However, as described herein, in embodiments TV speakers 404 may be used to produce sound for center channel audio without changes to TV 402. For example, to enable TV 402 to produce sound for center channel audio (e.g., as in 208 of flowchart 200 of FIG. 2), CEC handling according to the described techniques and embodiments may be performed.

Figure 5:
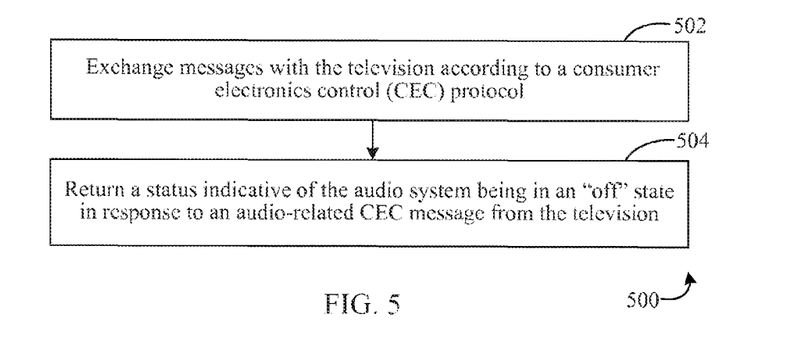
FIG. 5 is a flowchart of a method for configuring television speakers, according to an exemplary embodiment.

In such embodiments, audio processing device 102 (the "audio system") may be configured to operate according to flowchart 500 of FIG. 5. For instance, messages are exchanged with the television according to a consumer electronics control (CEC) protocol (502). That is, as noted above, CEC may be utilized for messaging/communications between HDMI devices over HDMI connections such as between TV 402 and audio processing device 102 over connector 108. As noted above, in typical operation, when audio processing device 102 is on, TV 402 will shut off its speakers. CEC messages from audio processing device 102 to TV 402 would, according to normal operation, indicate an "on" state if audio processing device 102 is powered on.

Thus, according to embodiments, a status indicative of the audio system being in an "off" state is returned in response to an audio-related CEC message from the television (504). That is, for audio related commands, audio processing device 102 may return a "system off" status in reply to CEC messages from TV 402 even when audio processing device 102 is in a powered on state. This technique allows TV 402 to keep TV speaker(s) 404 on even when audio processing device 102 is also in a powered on state. The center channel audio signal (i.e., a second portion of the audio signal) may be sent to TV 402 and to TV speaker(s) 404 via connector 108 to produce second sound, while other channels (i.e., a first portion) may be played by speakers 406, 408, 410, and 412 of audio processing device 102 (the "audio system") to produce first sound.

In standard implementations, the controls for audio channels (e.g., volume/mute) of audio processing device 102 (the "audio system") may be controlled only by audio processing device 102, and there may be no audio control for TV 402 in the system 400. In such cases, volume/mute controls from a remote control of TV 402 may only affect the TV 402 audio and may result in the volume levels being unbalanced. However, with changes to the CEC command handling for TV 402, according to the above-described embodiments and techniques, the following, without limitation, may be achieved:

By use of special commands according to the described techniques and embodiments, both TV 402 and the audio processing device 102 (the "audio system") may enter a special audio mode where status indications of "off" are returned to TV 402 in CEC messages, and in such a mode, both TV speaker(s) 404 of TV 402 and speakers 406, 408, 410, and 412 of audio processing device 102 (the "audio system") may be on to concurrently produce sounds;

Audio commands (e.g., volume/mute) may be passed on to audio processing device 102 for handling when originating from TV 402; and The special mode may ensure that compatibility with other CEC devices associated with audio processing device 102 is maintained.

Figure 6:
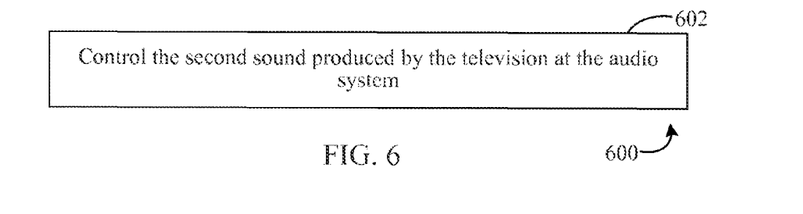
FIG. 6 is a flowchart of a method for configuring television speakers, according to an exemplary embodiment.

For instance, FIG. 6 is a flowchart 600 for television audio control. The second sound produced by the television is controlled at the audio system (602). As noted above, a special mode may be entered in which audio processing device 102 (the "audio system") and TV 402 both have their respective speakers activated. In such a mode, audio processing device 102 controls the sounds produced by TV speaker(s) 404 via sound control component 312 as shown in FIG. 3. The special mode allowing TV center channel audio output may be entered based on a "center mode"

command entered by a user or automatically generated in response to detecting an HDMI connection to TV 402 via connector 108.

Compatibility for other CEC devices associated with audio processing device 102 is maintained at least because the other CEC devices are not affected by the "center mode" command whether these devices support the command or not.

2. Audio Return Channel (ARC)

According to embodiments for handling HDMI audio, the handling of the ARC protocol may be accomplished as follows. Initially, no center channel audio can be played as TV 402 may be in a mode to receive non-HDMI input. Even if TV 402 has an HDMI input selected, the TV may be on a different HDMI port, thus the center channel audio may not be played on the TV speakers.

When TV 402 initiates the ARC protocol per the HDMI standard, TV 402 may send two-channel content (e.g., pulse-code modulation or PCM) to audio processing device 102, and TV 402 may mute TV speaker(s) 404. Audio processing device 102 may play two-channel content on speakers 406, 408, 410, and 412 of audio processing device 102, and no content may be sent via HDMI connection 108 to TV speaker(s) 404. However, after ARC initiation, the HDMI port of TV 402 may be known and the "center mode" described above may be entered to enable center channel audio sound to be produced by TV 402.

When TV 402 initiates ARC and sends multi-channel content to audio processing device 102, TV 402 may mute TV speaker(s) 404, and audio processing device 102 may play multi-channel content on speakers 406, 408, 410, and 412. Audio processing device 102 may compensate for the center channel audio on speakers 406 and 408 as no content may yet be sent via HDMI connector 108 to TV 402. However, after ARC initiation, the HDMI port of TV 402 may be known and the "center mode" described above may be entered to enable center channel audio sound to be produced by TV 402.

If ARC is initiated by audio processing device 102, the two-channel and multi-channel scenarios described above may be applied unchanged.

B. Handling HDMI Audio by Electronic Devices

Additional example embodiments for handling HDMI audio by electronic devices, such as TV 402, are also provided herein. For instance, FIG. 7 is a block diagram of a television configuration 700 to produce center channel audio sound.

Figure 7:
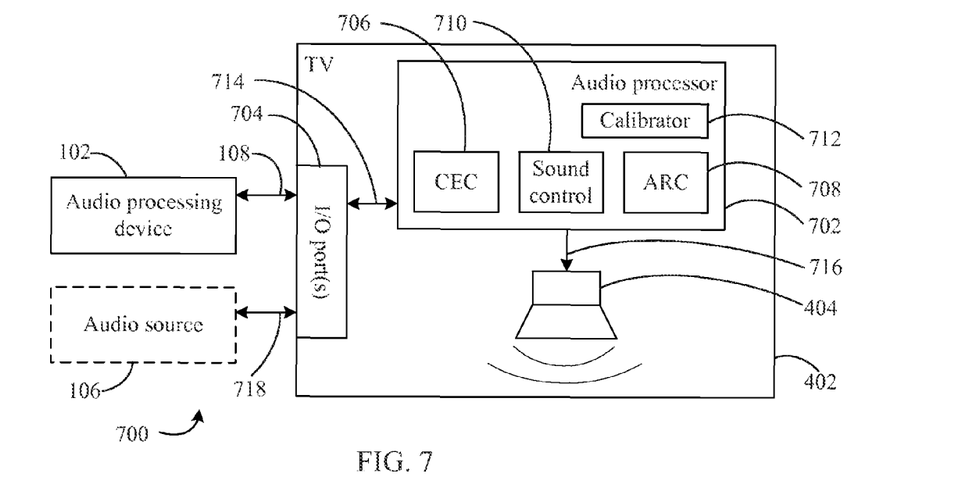
FIG. 7 is a block diagram of a television configured to produce center channel audio sound, according to an exemplary embodiment.

FIG. 7 includes TV 402 having TV speaker(s) 404 as described with respect to FIG. 4. TV 402 may communicate according to HDMI messaging with audio processing device 102 via connector 108. Additionally, TV 402 includes audio processor 702 and input/output (I/O) port(s) 704. Audio processor 702 includes a calibrator 712 that may be configured to calibrate TV speakers 404, a consumer electronics control (CEC) component 706 and an ARC component 708 that are configured to implement aspects of the HDMI protocol standard for CEC and ARC messages/signals. Sound control component 710 is configured to control sound (e.g., volume (including mute), balance, fade, treble, base, etc.) generated by TV speaker(s) 404.

Figure 8:
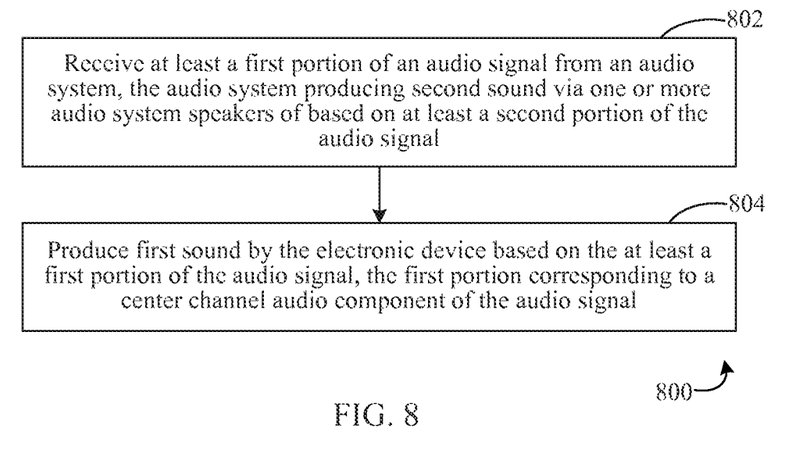
FIG. 8 is a flowchart of a method for configuring television speakers, according to an exemplary embodiment.

Turning to FIG. 8, a flowchart 800 for producing center channel audio sound by TV 402 is provided. At least a first portion of an audio signal is received from an audio system, the audio system producing second sound via one or more audio system speakers based on at least a second portion of the audio signal (802). For example, as described above with respect to FIG. 4, audio processing device 102 may produce sound according to one or more audio channel signals such as surround sound channels (i.e., a second portion) via speakers 406, 408, 410, and 412. TV 402 receives a first portion of the audio signal (e.g., a center channel) from audio processing device 102 over connector 108 at I/O port(s) 704 shown in FIG. 7.

First sound is produced by the electronic device based on the at least a first portion of the audio signal, the first portion corresponding to a center channel audio component of the audio signal (804). For instance, TV 402 may produce first sound using TV speaker(s) 404 according to the received first portion of the audio signal in 802. I/O port(s) 704 may provide the received first portion of the audio signal to audio processor 702 via a connector 714. Audio processor 702 may process the received first portion of the audio signal prior to providing it to TV speaker(s) 404 via a connector 716. The received first portion of the audio signal may correspond to center channel audio in embodiments, thus TV 402 is configured to produce center channel audio sounds.

Figure 9:
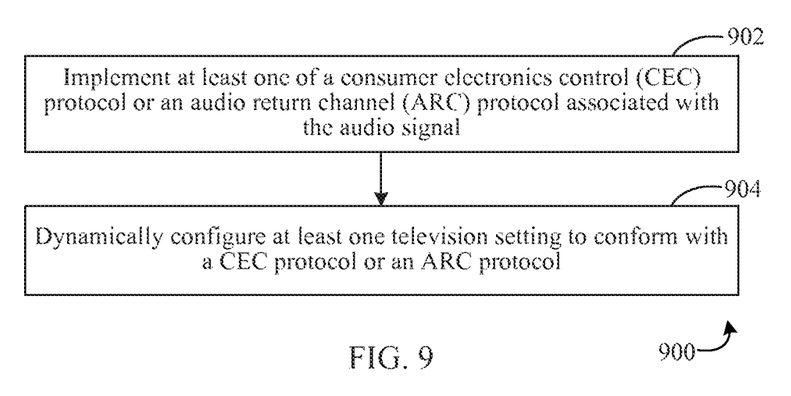
FIG. 9 is a flowchart of a method for configuring television speakers, according to an exemplary embodiment.

As described herein, TV 402 is configured to communicate with audio processing device 102 using HDMI protocol messaging, according to embodiments. Referring to FIG. 9, a flowchart 900 for communication using HDMI protocols is provided. At least one of a consumer electronics control (CEC) protocol or an audio return channel (ARC) protocol associated with the audio signal is implemented (902). CEC protocol requirements may be implemented by TV 402 using CEC component 706, and ARC protocol requirements may be implemented by TV 402 using ARC component 708.

At least one television setting is dynamically configured to conform with a CEC protocol or an ARC protocol (904). In embodiments TV 402 may dynamically configure settings such as handling of CEC and/or ARC commands (e.g., via CEC component 706/ARC component 708), sound control (e.g., via sound control component 710), and/or the like.

Figure 10:
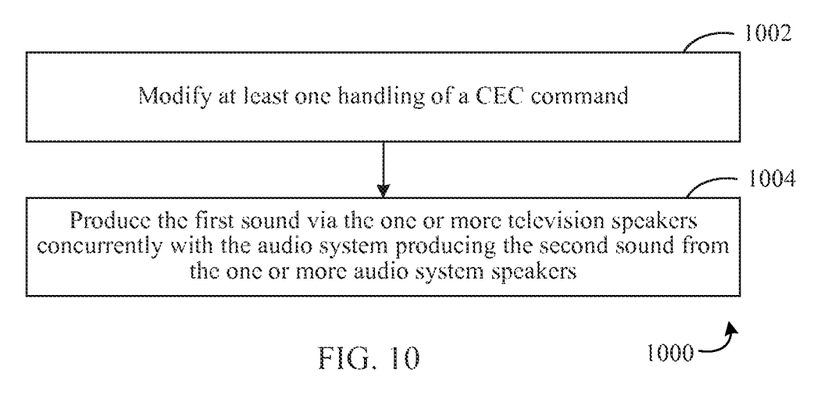
FIG. 10 is a flowchart of a method for configuring television speakers, according to an exemplary embodiment.
Figure 11:
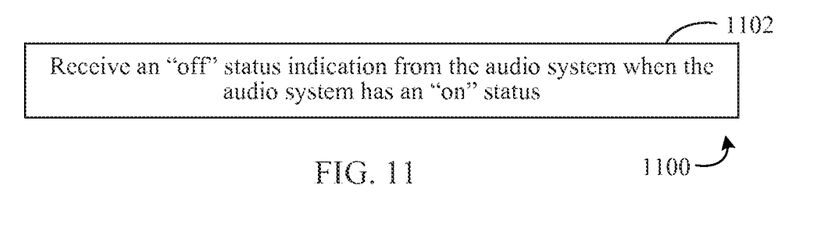
FIG. 11 is a flowchart of a method for configuring television speakers, according to an exemplary embodiment.

For example, as shown in flowchart 1000 of FIG. 10, at least one handling of a CEC command may be modified (1002). In an embodiment, CEC component 706 and/or ARC component 708 could be configured to ignore an "on" status from an audio system (e.g., audio processing device 102 of FIG. 4), or as shown in flowchart 1100 of FIG. 11, to receive an "off" status indication from the audio system when the audio system has an "on" status (1102). In embodiments, disregarding the system status of an audio system using either of the techniques above may allow TV 402 to also produce audio via TV speaker(s) 404 (e.g., first sound) at the same time with audio system speakers (e.g., second sound) as described with respect to FIG. 4.

Referring back to flowchart 1000 of FIG. 10, the first sound may be produced via the one or more television speakers concurrently with the audio system producing the second sound from the one or more audio system speakers (1004). That is, as noted above, TV speaker(s) 404 may concurrently produce sound with audio system speakers such as speaker 406, speaker 408, speaker 410, and speaker 412 of audio processing device 102 as shown in FIG. 4.

Figure 12:
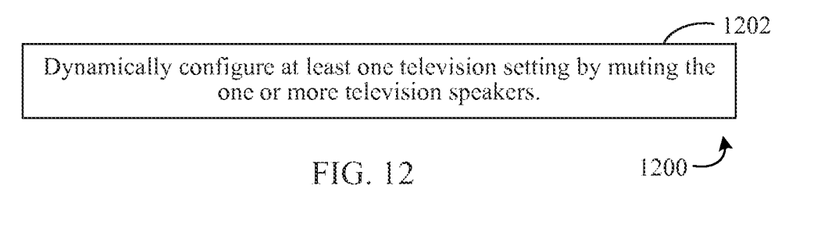
FIG. 12 is a flowchart of a method for configuring television speakers, according to an exemplary embodiment.

In alternate embodiments, at least one television setting may be dynamically configured by muting the one or more television speakers (1202). For instance, TV speaker(s) 404 may be muted by TV 402 via sound control component 710, or the volume of TV sound generated via TV speaker(s) 404 may be adjusted.

IV. Non-HDMI Audio Embodiments

For non-HDMI audio embodiments, e.g., where audio output from audio processing device 102 or audio source 106 to TV 402 is through any connection type other than HDMI, a separate and/or dedicated center channel output may be provided to TV 402 from audio processing device 102 or audio source 106. In such embodiments, video data may be connected separately either through an AVR (e.g., audio processing device 102 may be included in an AVR or may be an AVR) or directly to TV 402 from a video source.

V. TV Speakers without an External Audio System

In embodiments for which the TV speakers are the only speakers (i.e., no audio signals are received from an AVR or external audio system such as audio processing device 102 shown in FIGS. 1, 3, and 4), connecting a TV to an audio source device is straight-forward. Audio/video connections provided from audio/video sources may be coupled to the TV as long as they are compatible.

An example alternate configuration is shown in FIG. 7 for TV speakers without an external audio system (such as audio processing device 102). In this alternate embodiment, audio source 106 is connected to TV 402 via a connector 718 rather than audio processing device 102. In embodiments, the audio quality of the TV speaker(s) 404 may be improved by including an AVR or audio system (e.g., audio processing device 102) between audio source 106 and TV 402 (e.g., as shown in FIG. 1) even if TV 402 is the only sound producer, or by modifying audio processor 702 of TV 402, according to one more embodiments herein. For instance, in embodiments, audio processor 702 of television 402 may be configured to calibrate TV speaker(s) 404 and/or to perform other television speaker configurations described herein.

VI. Calibrating TV Speakers

Figure 13:
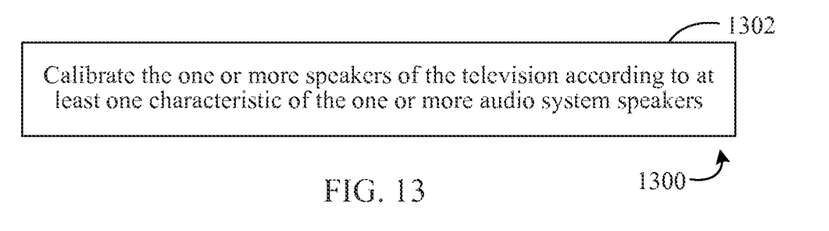
FIG. 13 is a flowchart of a method for configuring television speakers, according to an exemplary embodiment.

As noted above, embodiments also provide for the TV speakers to be calibrated. Irrespective of whether the TV speakers are the only speakers in a system as described with respect to FIG. 7, or whether they are part of an audio system with external speakers as shown in FIG. 4, the TV speakers may be calibrated for a better audio experience considering the speaker characteristics (of the TV and/or other speakers) and the room acoustics, according to embodiments. FIG. 13 shows a flowchart 1300 for calibrating speakers of a TV. Flowchart 1300 is described as follows.

One or more speakers of the television may be calibrated according to at least one characteristic of the one or more audio system speakers (1302). This calibration may configure the speakers of the television to operate and/or function similarly to the speakers of the audio system, thereby providing improved audio quality and an improved listening experience.

For example, TV speakers may be calibrated or approximately calibrated to electrical specifications of external speakers of an audio system, as described with respect to FIG. 4. In embodiments, calibration may be performed by calibrator 712 of FIG. 7 or by calibrator 314 of FIG. 3. Additional details regarding calibration are provided in U.S. patent application Ser. No. 12/988,486, issued as U.S. Pat. No. 8,588,431, entitled "Electrical System for a Speaker and its Control," the entirety of which is incorporated by reference herein.

VII. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The TV speaker configuration embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 14:
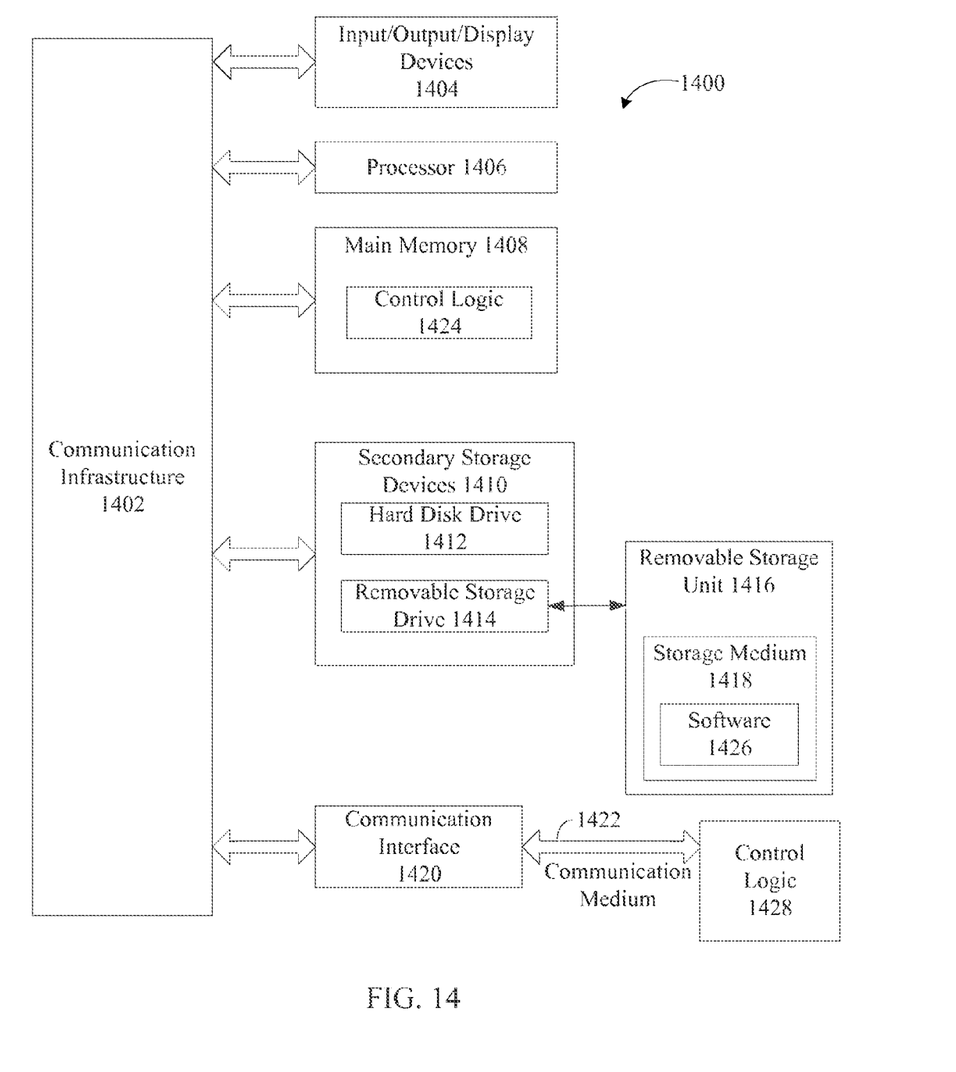
FIG. 14 is a block diagram of a computer system, according to an exemplary embodiment.

The embodiments described herein, including systems, methods/processes, and/or apparatuses, may be implemented using audio/video devices and/or well-known processing devices, telephones (smart phones and/or mobile phones), servers, and/or, computers, such as a computer 1400 shown in FIG. 14. It should be noted that processing device 1400 may represent communication devices/systems, entertainment systems/devices, processing devices, and/or traditional computers in one or more embodiments.

Processing device 1400 can be any commercially available and well known communication device, processing device, and/or computer capable of performing the functions described herein, such as devices/computers available from International Business Machines®, Apple®, Sun®, HP®, Dell®, Cray®, Samsung®, etc. Processing device 1400 may be any type of computer, including a desktop computer, a server, etc., and may be a computing device or system within another device or system.

Processing device 1400 includes one or more processors (also called central processing units, or CPUs), such as a processor 1406. Processor 1406 is connected to a communication infrastructure 1402, such as a communication bus. In some embodiments, processor 1406 can simultaneously operate multiple computing threads, and in some embodiments, processor 1406 may comprise one or more processors.

Processing device 1400 also includes a primary or main memory 1408, such as random access memory (RAM). Main memory 1408 has stored therein control logic 1424 (computer software), and data.

Processing device 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, processing device 1400 may include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1418 having stored therein computer software 1426 (control logic) and/or data. Removable storage unit 1416 represents a floppy disk, magnetic tape, compact disk, DVD, optical storage disk, or any other computer data storage device. Removable storage drive 1414 reads from and/or writes to removable storage unit 1416 in a well-known manner.

Processing device 1400 also includes input/output/display devices 1404, such as touchscreens, LED and LCD displays, monitors, keyboards, pointing devices, etc.

Processing device 1400 further includes a communication or network interface 1420. Communication interface 1420 enables processing device 1400 to communicate with remote devices. For example, communication interface 1420 allows processing device 1400 to communicate over communication networks or mediums 1422 (representing a form of a computer useable or readable medium), such as LANs, WANs, the Internet, etc. Network interface 1420 may interface with remote sites or networks via wired or wireless connections.

Control logic 1428 may be transmitted to and from processing device 1400 via the communication medium 1422.

Any apparatus or manufacture comprising a computer useable or readable medium having control logic (software) stored therein is referred to herein as a computer program product or program storage device. This includes, but is not limited to, processing device 1400, main memory 1408, secondary storage devices 1410, and removable storage unit 1416. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

While the techniques and embodiments described herein may be implemented as, or in, various types of devices. For instance, embodiments may be included, without limitation, in processing devices (e.g., illustrated in FIG. 14) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. §101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1406 of FIG. 14), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VIII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method in an audio/video device comprising:
   receiving at least a first portion of an audio signal generated by an audio source from an audio processing device, the audio processing device producing second sound via one or more audio processing device speakers based on at least a second portion of the audio signal; and
   producing first sound by the audio/video device based on the at least a first portion of the audio signal, the first portion corresponding to a center channel audio component of the audio signal, the audio/video device being enabled to produce the first sound by modifying at least one handling of a consumer electronics control (CEC) command to indicate an "off" status of the audio processing device when the audio processing device has an "on" status.

2. The method of claim 1, wherein the audio signal is a high-definition media interface (HDMI) audio signal.

3. The method of claim 2, wherein the audio/video device is a television that includes one or more television speakers to produce the first sound; and
wherein an audio return channel (ARC) protocol associated with the audio signal is implemented.

4. The method of claim 3, wherein the television dynamically configures at least one television setting to conform to a CEC protocol or the ARC protocol.

5. The method of claim 4, wherein the television produces the first sound via the one or more television speakers concurrently with the audio processing device producing the second sound from the one or more audio processing device speakers.

6. The method of claim 4, wherein the television dynamically configures the at least one television setting by muting the one or more television speakers.

7. The method of claim 3, further comprising:
calibrating the one or more television speakers according to at least one characteristic of the one or more audio processing device speakers.

8. A method performed in an audio processing device, the method comprising:
receiving an audio signal from an audio source, the audio signal comprising at least a first portion and a second portion;
exchanging messages with an audio/video device according to a consumer electronics control (CEC) protocol;
returning a status indicative of the audio processing device being in an "off" state in response to an audio-related CEC message from the audio/video device;
processing at least the first portion of the audio signal;
producing first sound via one or more speakers of the audio processing device based on at least the first portion subsequent to the processing; and
providing at least the second portion of the audio signal to the audio/video device comprising at least one speaker to produce second sound.

9. The method of claim 8, wherein the second portion of the audio signal is a high-definition media interface (HDMI) audio signal; and
wherein the second portion of the audio signal corresponds to a center channel portion of the audio signal.

10. The method of claim 8, wherein the audio/video device is a television.

11. The method of claim 10, wherein returning the status indicative of the audio processing device being in the "off" state is performed while the audio processing device is in an "on" state and preventing the television from disabling the at least one speaker of the television.

12. The method of claim 8, further comprising:
controlling the second sound produced by the television at the audio processing device.

13. An audio processing device, comprising:
an input component configured to receive an audio signal from an audio source;
a processing component configured to process at least a first portion of the audio signal;
a consumer electronics control (CEC) component configured to:
exchange messages between the audio processing device and an audio/video device according to a CEC protocol; and
return a status indicative of the audio processing device being in an "off" state in response to an audio-related CEC message from the audio/video device; and
an output component configured to:
provide the first portion of the audio signal to one or more speakers of the audio processing device to produce first sound subsequent to being processed; and
provide a second portion of the audio signal to the audio/video device having at least one speaker to produce second sound.

14. The audio processing device of claim 13, wherein the second portion of the audio signal is a high-definition media interface (HDMI) audio signal.

15. The audio processing device of claim 13, wherein the second portion of the audio signal corresponds to a center channel portion of the audio signal.

16. The audio processing device of claim 13, wherein the audio/video device is a television.

17. The audio processing device of claim 16, wherein the CEC component is configured to:
return the status indicative of the audio processing device being in the "off" state while the audio processing device is in an "on" state and prevent the television from disabling the at least one speaker of the television.

18. The audio processing device of claim 17, wherein the status enables the television to produce the second sound concurrently with the first sound.

19. The audio processing device of claim 17, wherein the processing component is configured to control the second sound produced by the television.

* * * * *

UNITED STATES PATENT AND TRADEMARK OFFICE
CERTIFICATE OF CORRECTION

PATENT NO. : 9,832,524 B2
APPLICATION NO. : 14/945104
DATED : November 28, 2017
INVENTOR(S) : Satheesh et al.

Page 1 of 1

It is certified that error appears in the above-identified patent and that said Letters Patent is hereby corrected as shown below:

On the Title Page

Item [72], delete "Harihapur" and insert -- Hariharpur --, therefor.

Signed and Sealed this
Twelfth Day of June, 2018

Andrei Iancu
*Director of the United States Patent and Trademark Office*